United States Patent [19]

Kronsbein

[11] 4,157,968
[45] Jun. 12, 1979

[54] FILTERS

[75] Inventor: Dirk G. Kronsbein, Düsseldorf, Fed. Rep. of Germany

[73] Assignee: Ultrafilter GmbH, Düsseldorf, Fed. Rep. of Germany

[21] Appl. No.: 874,528

[22] Filed: Feb. 2, 1978

[30] Foreign Application Priority Data

Feb. 12, 1977 [DE] Fed. Rep. of Germany ....... 2706017

[51] Int. Cl.² .................. B01D 25/04; B01D 25/16
[52] U.S. Cl. .................... 210/489; 55/482; 55/485; 55/487; 210/492; 210/503
[58] Field of Search ............ 55/482, 485, 486–489; 210/483, 484, 485, 487, 488, 489, 492, 493 P, 491, 503

[56] References Cited

U.S. PATENT DOCUMENTS

| 1,892,210 | 12/1932 | Gordon | 210/489 |
| 2,771,153 | 11/1956 | Hennig | 55/487 |
| 3,567,619 | 3/1971 | Brown | 55/486 |
| 4,058,463 | 11/1977 | Bartik | 210/489 |

Primary Examiner—Frank Sever
Attorney, Agent, or Firm—Toren, McGeady and Stanger

[57] ABSTRACT

A filter element for filtering air, other gases and liquids comprises two permeable supporting shells arranged one within the other, and a filter medium filling the space between the shells. The filter medium is formed by a plurality of layers of different filter gauge. The finest filter layer is covered by a coarser filter layer at least on its side which is, in use, towards the inlet for the fluid to be filtered. Preferably the filter medium includes three layers, the middle layer of which is the finest filter consisting of binder-free microfiber fleece and the other two layers are similar coarser filters consisting of binder-free supporting fiber fleece.

4 Claims, 2 Drawing Figures

FILTERS

This invention relates to a filter element for filtering air and other gases and for filtering liquids, in which two permeable supporting shells are arranged one within the other with a filter medium in the space between the two supporting shells.

Such filter elements are frequently used in a replacable cartridge form as inserts in housings through which the liquid or gas to be filtered flows. However, the presently known filter elements have substantial drawbacks. Firstly, their surface which is initially contacted by the fluid to be filtered tends to clog very rapidly and after a relatively short time a high differential pressure is produced across it as a result of this clogging. Secondly, such elements usually use a resin reinforced fibre material for the filter medium in which the resin binding agent is for example, polyvinyl, alcohol, acetate or chloride. It is true that this imparts some inherent stability to the filter medium, but the resultant sticking together of the fibres leads to various disadvantages. The binder reduces the volume of free space within the filter medium with the result that the dirt collecting capacity and thus life of the filter element is reduced as well as reducing its efficiency. A further disadvantage lies in the susceptibility of these known filter elements to heat, caused by the melting or softening of the binder. The melting point may be about 120° C., so that changes in the binder occur from 60° C. and upwards. As soon as this temperature is exceeded, the binder softens and the resin bonded fibre material starts to collapse. This need not always be noticed straight away, so that apart from the rapid deterioration of the filtering efficiency the liquid or gas emerging from the filter may be contaminated by detached particles of this binder or of any additives used. These filter elements are also sensitive to attack by, for example, $H_2O_2$, which will also result in the collapse of the resin bonded fibre material. Furthermore, incubation centres for bacteria may form, which is a considerable disadvantage in the case of sterile filters. The various disadvantages mentioned limit the range of use of the known filter elements and their effective life and this makes their use uneconomic.

According to this invention a filter element comprises two permeable supporting shells arranged one within the other, and a filter medium in the space between the shells, the filter medium having a number of layers of different filter gauge, the finest filter layer being covered by a coarser filter layer at least on its side which is, in use, towards the inlet for the fluid to be filtered.

A filter element in accordance with this invention has a surprisingly intense depth effect, since particles of different sizes penetrate into the filter to different depths. Thus large particles do not reach the finest filter layer but are trapped prior thereto in the coarser layer, whereas smaller particles penetrate into the finest layer of the filter medium. This leads to the dirt being distributed through the filter medium with the largest particles towards the outside and the smaller particles towards the middle. This compares favourably with the rapidly clogging known filter media mentioned initially, in which substantially all the dirt collects on the surface of the filter medium. The filter element according to this invention is suitable for substantially larger particle concentrations, since by virtue of its two-stage depth effect, its dirt accommodating capacity is substantially greater, which means that the same pressure differential takes longer to be built up.

The advantages gained by a filter element in accordance with this invention enable the elements to be used for a wide variety of applications and to operate to a higher degree of efficiency and comparatively longer active life. By virtue of the increased efficiency of the filter in collecting dirt through its filter medium, it is possible to make them smaller and more compact than before for the same degree of filtration and efficiency.

Preferably, the filter medium includes three layers of symmetrical structure, the middle layer thereof being the finest filter layer and consisting of binder-free microfibre fleece, and the outer layers are coarser and each consist of a layer of binder-free supporting fibre fleece. This construction of filter element can be used effectively and safely with the flow of fluid to be filtered passing in either direction through the filter. The supporting shells and the coarser supporting fibre fleece being provided on both sides makes it possible to keep the finest layer of the filter medium located in the middle free from organic and inorganic binders, so that the entire element can operate effectively at high temperatures and with aggressive media with no loss of efficiency. The absence of binders in the filter medium enables the same surface area of medium to have a larger capacity for holding dirt than conventional filter material including binders. Dirt is trapped through the depth of the filter material not only at its surface leading to a substantially larger depth of filtration, thus the filter medium may be referred to as a three-dimensional microfibre fleece. Furthermore, such a filter can be made chemically, biochemically and biologically inactive, since there is no need for any organic or inorganic binders or additives to be used.

The layer or layers of coarse filter medium help to support the finest layer of filter medium and also form a preliminary filter which prevents the coarser particles of the dirt reaching and clogging the surface of the finest filter layer.

Glass fibre material consisting of fibres substantially $0.2\mu$ has been found to be the preferred material for the finest filter layer with the fibres being in the form of a three dimentional layered microfibre fleece. The coarser filter layer or supporting layer which forms a preliminary filter preferably consists of a fleece of nylon fibres. Since no resin binder material is used, it is possible to reduce the diameter of the individual fibres, so that it is possible to achieve a comparatively high cavity volume ratio, i.e. the volume of free space within the filter medium compared to the total volume of the filter material.

For some applications, the filter element may include a foam jacket covering its outer surface through which the filtered fluid leaves the element and which will, as a rule, be on the outside of the filter element. Conventionally, replaceable cartridge type filter elements have the fluid to be filtered introduced into their inside and it them passes through the medium to the outside. The additional foam jacket ensures that no aerosols are entrained with a filtered gas stream, for example when filtering compressed air to remove oil, even when the indicated capacity rating (0 to 200%) is exceeded.

A particular example of a filter element in accordance with this invention will now be described with reference to the accompanying drawings, in which.

This example of a filter element is constructed as a replacement cartridge and shaped like a hollow cylinder. The element includes a top cover 1 and a bottom cover 2 with the filter medium extending between them. The top cover 1 includes a central coaxial spigot having a male screw thread 3 for fixing the cartridge into the feed line of a filter housing, not shown. An encircling sealing ring 4 on the spigot beneath the screw thread ensures that a fluid tight seal is formed between the interior of the cartridge to which the fluid to be filtered is supplied and the cavity within the filter housing enclosing the cartridge and containing the filtered fluid.

Figure 1:
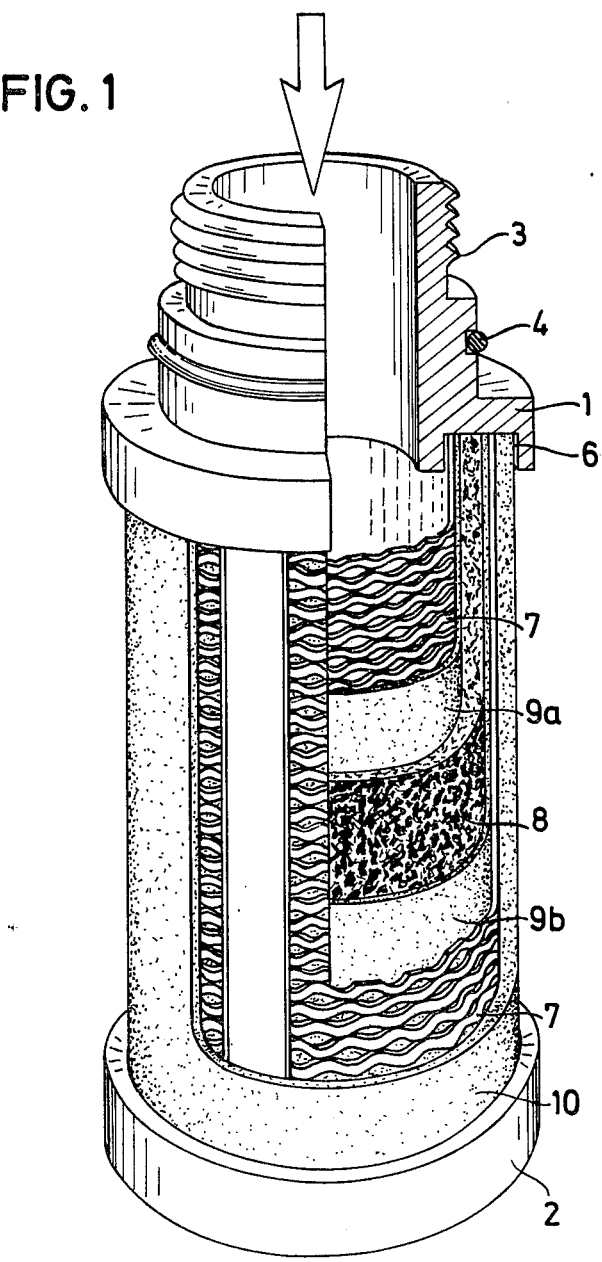
FIG. 1 is a cut-away perspective view of a cartridge-type filter element.
Figure 2:
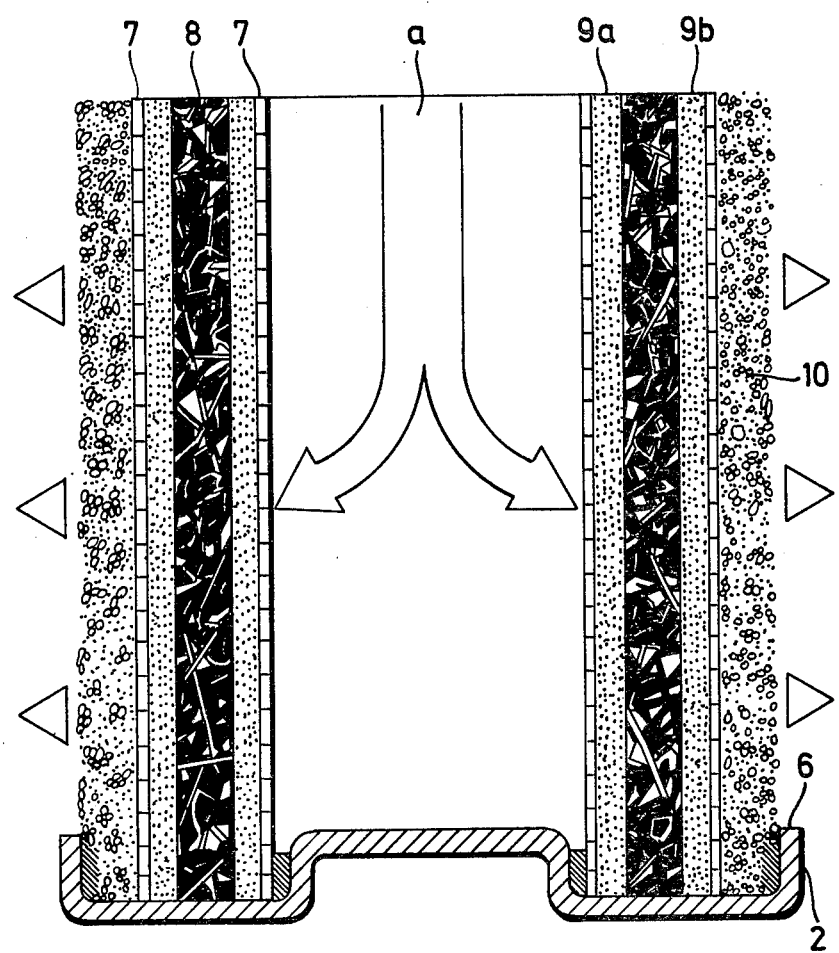
FIG. 2 is a longitudinal section through the bottom part of the element.

In this example, the filter medium is of cylindrical form. In FIG. 2, the arrow a shows the feed of fluid to be filtered to the inside of the filter medium, the fluid emerging cleansed from the outside of the medium shown by the arrowheads e. The bottom cover 2 includes an upstanding flange around its periphery and towards its middle so that the cylinder of the filter medium is placed in an encircling U-shaped channel 5. The top cover 1 is shaped with a similar U-shaped channel and the filter medium is connected to the top and bottom covers 1 and 2 by adhesive 6 applied on the inside and outside of the top and bottom ends.

In this example, the filter medium is of symmetrical construction and consists of three layers, to be described in greater detail hereinafter, which are inserted between two coaxial, cylindrical, reticulated stainless steel supporting shells 7 provided over their entire surface with a pattern of apertures. The apertures may be shaped differently from those illustrated, so long as they do not impede the flow of fluid through them. The middle filter layer 8 consists of a binder-free glass fibre microfibre fleece, and as already mentioned this material has a very large volume of free space within it leading to a considerable depth effect so that it may be regarded as a three-dimensionally acting filter medium.

Both the inner and outer surfaces of the middle layer 8 are covered with layers 9a and 9b respectively of a supporting fibre fleece based on nylon and likewise containing no binder. The supporting layers 9a and 9b are coarser filters than the middle layer 8 and constitute a pre-filter which enhances the efficacy and prolongs the working life of the filter, thereby guaranteeing lasting functional reliability. The disposition of this pre-filter and supporting layer on both sides of the middle microfibre fleece enables the filter element to be used with a flow through the element in either direction, for example for cleaning purposes. The materials used for the filter element make it possible to use the filter element for liquids and gases where the utmost sterility is important. The field of application of the filter element described comprises the filtering of oil, water and dirt out of compressed air and other gases and also the fine filtration of liquid, vapour and dust.

Particularly where filters are used for eliminating oil from compressed air, an additional foam jacket 10 is preferably provided on the outside of the element and this ensures that no aerosols find their way into the filtered stream of air. In this respect, of course, other outer coverings are conceivable according to the special media to be filtered or cleaned.

I claim:

1. A filter element for filtering air, other gases and liquids, comprising a filter medium, a first outlet side and a second inlet side permeable supporting shell, means supporting said second supporting shell inside and in spaced relation from said first supporting shell and supporting said filter medium in the space between said first and second supporting shells, said filter medium having a plurality of layers of different filter gauge comprising an inlet side filter layer adjacent said second supporting shell, an outlet side filter layer adjacent said first supporting shell and an intermediate filter layer located between said inlet side and outlet side filter layers, said intermediate filter layer consists of binder-free glass microfibre fleece of substantially $0.2\mu$ and said inlet side and outlet side filter layers consist of binder-free supporting nylon fibre fleece greater than $0.2\mu$.

2. A filter element according to claim 1, wherein said intermediate filter layer of finer gauge includes a fleece of glass fibres, and said inlet side and outlet side filter layers each includes a fleece of nylon fibres.

3. A filter element according to claim 1, including a foam jacket covering the opposite side of said first permeable supporting shell from said outlet side filter layer whereby, in operation, the fluid filtered through said filter medium leaves said element through said foam jacket.

4. A filter element for filtering compressed air to remove oil and other impurities comprising, a filter medium, said filter medium having three layers of filter medium of different gauge arranged symmetrically, the middle layer being of a finer filter gauge and the other two layers being of a coarser gauge, said middle layer consisting of a binder-free glass microfibre fleece of substantially $0.2\mu$ and said other two layers each consisting of a fleece of nylon fibres greater than $0.2\mu$; a first and a second rigid, permeable cylindrical supporting shell; means supporting said second supporting shell radially inwardly within said first supporting shell and supporting said filter medium in the space defined between said first and second supporting shells; and, a jacket of foamed plastic material surrounding said first supporting shell, whereby said foam jacket captures any liquid aerosols entrained with said compressed air flowing through said medium.

* * * * *

REEXAMINATION CERTIFICATE (206th)
United States Patent [19]
Kronsbein

[11] B1 4,157,968
[45] Certificate Issued Jun. 5, 1984

[54] FILTERS

[75] Inventor: Dirk G. Kronsbein, Düsseldorf, Fed. Rep. of Germany

[73] Assignee: Ultrafilter GmbH, Düsseldorf, Fed. Rep. of Germany

Reexamination Request:
No. 90/000,175, Mar. 12, 1982

Reexamination Certificate for:
Patent No.: 4,157,968
Issued: Jun. 12, 1979
Appl. No.: 874,528
Filed: Feb. 2, 1978

[30] Foreign Application Priority Data

Feb. 12, 1977 [DE] Fed. Rep. of Germany ....... 2706017

[51] Int. Cl.³ .................... B01D 25/04; B01D 25/16
[52] U.S. Cl. .................................. 210/489; 55/482; 55/485; 55/487; 210/492; 210/503

[58] Field of Search ............... 55/482, 485, 486–489; 210/483–489, 492, 493.2, 491, 503, 493.5, 497.01, 508, 509, 315

[56] References Cited
U.S. PATENT DOCUMENTS
3,460,680 8/1969 Domnick ........................... 210/315

FOREIGN PATENT DOCUMENTS
900450 7/1962 United Kingdom .

*Primary Examiner*—Frank Sever

[57] ABSTRACT

A filter element for filtering air, other gases and liquids comprises two permeable supporting shells arranged one within the other, and a filter medium filling the space between the shells. The filter medium is formed by a plurality of layers of different filter gauge. The finest filter layer is covered by a coarser filter layer at least on its side which is, in use, towards the inlet for the fluid to be filtered. Preferably the filter medium includes three layers, the middle layer of which is the finest filter consisting of binder-free microfiber fleece and the other two layers are similar coarser filters consisting of binder-free supporting fiber fleece.

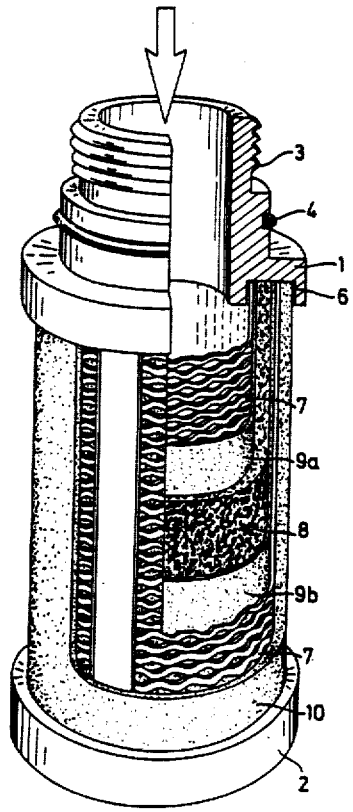

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1-4 is confirmed.

* * * * *